United States Patent [19]
Shimizu et al.

[11] Patent Number: 5,943,680
[45] Date of Patent: *Aug. 24, 1999

[54] OUTPUT APPARATUS IN WHICH A PLURALITY OF IMAGES HAVING A PLURALITY OF ACCURACY OF COLORS ARE OUTPUT TO OUTPUT DEVICES HAVING DIFFERENT ACCURACY OF COLORS

[75] Inventors: Haruo Shimizu, Kawasaki; Osamu Yoshizaki, Hachiohji; Manabu Ohga, Yokohama, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/380,339

[22] Filed: Jan. 30, 1995

Related U.S. Application Data

[63] Continuation of application No. 07/757,482, Sep. 10, 1991, abandoned.

[30] Foreign Application Priority Data

Sep. 11, 1990 [JP] Japan ..................................... 2-239052

[51] Int. Cl.⁶ ..................................................... G09G 5/04
[52] U.S. Cl. ........................................... 707/528; 707/500
[58] Field of Search .................................... 395/101, 102, 395/145, 146, 147, 148, 161, 761, 790, 791; 345/131, 132, 150, 153, 155; 707/500, 528

[56] References Cited

U.S. PATENT DOCUMENTS

| | | | |
|---|---|---|---|
| 4,747,081 | 5/1988 | Heilveil et al. | 345/132 X |
| 4,953,108 | 8/1990 | Kato et al. | 395/147 |
| 4,958,301 | 9/1990 | Kobayashi | 395/147 X |
| 4,988,984 | 1/1991 | Gonzalez-Lopez | 345/132 |

(List continued on next page.)

FOREIGN PATENT DOCUMENTS 0303138  2/1989  European Pat. Off. .

OTHER PUBLICATIONS

Society For Information Display Seminar Lecture Notes 1989. May 15–19, 1989, Baltimore, MD, US pp. 2.1 –2.35. T. Baffico 'Page Description for Displays and Printers' pp. 2.26 –2.27.

Computers and Graphics vol. 11, No. 4, 1987, Oxford GB pp. 369 –375, XP000115886 W. Appelt 'Existing Systems for Integrating Text and Graphics' p. 370, left col., line 56—p. 372, right col., line 49.

AT & T Technical Journal col. 68, No. 4, Jul./Aug. 1989, New York US pp. 100–110, XP000102595 N.–P. Nelson & C. L'Hommedieu 'An Open Architecture Corporate Publishing Platform' the whole document.

Computer Communications, vol. 12, No. 2, Apr. 1989, Guildford GB pp. 85–92, XP000120295, P.J. Robinson & S.M. Strasen 'Standard Page Description Language', abstract, p. 88, left col., line 31—right col., line 11.

*Primary Examiner*—Phu K. Nguyen
*Assistant Examiner*—Cliff N. Vo
*Attorney, Agent, or Firm*—Fitzpatrick, Cella, Harper & Scinto

[57] ABSTRACT

An information processing apparatus includes a composition device for composing document data, graphic data and image data. The document data to be composed is stored in a storage device in a form that is independent of the capacity of an output device. An output control device converts, in accordance with the capacity of the output device, the stored document data upon output to the output device, and controls the output device for outputting the converted document data.

65 Claims, 9 Drawing Sheets

U.S. PATENT DOCUMENTS

| | | | |
|---|---|---|---|
| 5,018,083 | 5/1991 | Watanabe et al. | 364/523 |
| 5,021,972 | 6/1991 | Nishi | 395/145 |
| 5,086,295 | 2/1992 | Boettcher et al. | 345/132 X |
| 5,122,784 | 6/1992 | Canova | 345/155 |
| 5,140,314 | 8/1992 | Stansfield et al. | 345/132 X |
| 5,142,620 | 8/1992 | Watanabe et al. | 395/164 |
| 5,153,936 | 10/1992 | Morris et al. | 345/132 X |
| 5,204,946 | 4/1993 | Shimamura | 395/147 X |
| 5,210,825 | 5/1993 | Kavaler | 395/147 |
| 5,228,121 | 7/1993 | Fontaine et al. | 395/148 X |
| 5,230,040 | 7/1993 | Yamashita | 395/148 |
| 5,233,685 | 8/1993 | Landes et al. | 395/147 |
| 5,315,693 | 5/1994 | Hirosawa | 395/102 X |

| COLORS | R | G | B |
|---|---|---|---|
| WHITE | 255 | 255 | 255 |
| BLACK | 0 | 0 | 0 |
| GREEN | 0 | 255 | 0 |
| RED | 255 | 0 | 0 |
| BLUE | 0 | 0 | 255 |
| YELLOW | 255 | 255 | 0 |
| CYAN | 0 | 255 | 255 |
| MAGENTA | 255 | 0 | 255 |

FIG. 8

| IMAGE \ DISPLAY | MONOCHROME (1 BIT) | PSEUDO (8 BIT) | FULL RANGE OF COLORS (24 BIT) |
|---|---|---|---|
| MONOCHROME (1 BIT) | UNCHANGED MONOCHROME | DITHER FOR A GIVEN COLOR 1 BIT | DITHER FOR A GIVEN COLOR 1 BIT |
| PSEUDO (8 BIT) | 8-BIT EXPANSION MONOCHROME | LUT SWITCHING (BETWEEN PSEUDO-COLORS) | · DITHER<br>· ERROR DIFFUSION<br>· SIMPLE COMPRESSION |
| FULL RANGE OF COLORS (24 BIT) | 24-BIT EXPANSION MONOCHROME | SWITCHING TO FULL RANGE OF COLORS FROM PSEUDO-COLORS | UNCHANGED |

MONOCHROME
(BIT MAP)

PSEUDO-COLORS

FULL RANGE OF COLORS

PSEUDO-COLORS OF FULL RANGE OF COLORS AND TEXT PLANE

FULL RANGE OF COLORS
OR PSEUDO-COLORS

OUTPUT APPARATUS IN WHICH A PLURALITY OF IMAGES HAVING A PLURALITY OF ACCURACY OF COLORS ARE OUTPUT TO OUTPUT DEVICES HAVING DIFFERENT ACCURACY OF COLORS

This application is a continuation of application Ser. No. 07/757,482 filed Sep. 10, 1991, now abandoned.

BACKGROUND OF THE INVENTION

1. Field of the Invention

The present invention relates to a document processing apparatus for creating and editing documents.

2. Description of the Related Art

There are two systems for performing the process of calculating the position where characters should optimally be arranged on a given page, that is, for performing a composition process, using recently developed document processing apparatuses, particularly those used in the DTP field.

One system is the What You See Is What You Get (WYSIWYG) system. Widely available types of word processors correspond to this system. This is a system in which the user inputs characters of a certain size to a position corresponding to the final printing shape (layout) while the user is watching the shape on a screen. This system has the following advantages and disadvantages:

Advantages

Because the user inputs characters while watching the final screen, he is able to create any document he wishes.

Excellent user interface

Short documents can be easily created.

Disadvantages

It is difficult to treat bulk documents in a standardized manner. (For instance, it is difficult to write an entire chapter using a fixed character size.)

A process similar to a batch process is required to create contents and indexes.

It is difficult to reuse documents in other systems.

A device exclusively for use with this system is required.

The other type of system is a batch-type system. The TEX created by Professor Knuth at Stanford University and the roff system developed by AT & T correspond to this system (refer to "Document Shaping Language" in Information Process, pages 559 to 654, by Izumi Kimura, July, 1981). FIG. 2 shows a process used in this system. A text editor 50 creates a source file 51 containing an instruction for composing a document. The source file 51 is then compiled to create an intermediate file 53 which stores the results of the composition. The results are displayed on a screen 54 or output on a printer 55.

This system has the following advantages and disadvantages:

Advantages

Bulk documents can be easily treated in a standardized manner.

A function for creating contents and indexes is easily adopted.

The system is capable of being operated even on workstations (WS's) having standard text terminals.

Disadvantages

Because the system is of a document program type, it is difficult for laymen to operate it.

The results of the process cannot be confirmed unless they are compiled and displayed.

Short documents are more easily created by the WYSIWYG system than by this system.

As understood from these comparisons, the WYSIWYG and batch-type document processing systems each have advantages and disadvantages. These systems have been expanded in recent years to solve their own disadvantages. The WYSIWYG system has adopted some of the advantages of the batch-type system: for example, a batch process for contents and indexes has been added, and a style sheet has also been added to create a document in which all the pages have the same page style. On the other hand, in the batch-type system, a structured editor is used so that the user can know the type of command to be entered next time through an icon or other means, rather than the user having to directly prepare a program for documents.

Thus, recent document composing processes have become hybrids of the WYSIWYG system and the batch-type system.

In most cases, both systems create documents in monochrome, except for special cases, such as when slides or OHP's are used.

It has hitherto been difficult for the batch-type system in particular to introduce color images and graphic forms into a document in a manner independent of the type of device used.

However, because of recent development in color monitors and advanced functions of peripheral equipment, there has been a demand for a previewer which handles color documents mixed with texts, images and graphic forms, that is, which displays the results of printing and composition.

Even when color texts, images and graphic forms can be utilized by a system according to its own method, data cannot be completely exchanged with other systems.

SUMMARY OF THE INVENTION

The present invention has been made in view of the above problems. An object of the invention is to provide a document processing apparatus capable of editing color texts and images, and of outputting the results of the editing so that the document can conform to the performance of a display device or a printing device connected to the apparatus.

Another object of the invention is to provide such a document processing apparatus, connected to a display device or a printing device, which creates a document in which a color text, image, and graphic form are shaped and composed. According to one aspect of the invention is provided such an apparatus which comprises indicating means for indicating how the color text, image, and graphic form are shaped and composed, in a manner independent of the types of display and printing devices; processing means for shaping and composing the document including the color text, image, and graphic form on the basis of the contents of the indicating means; and output control means for outputting the composed document including the color text, image, and graphic form so that the document can conform to the performance of the display or printing device.

A further object is to provide a document processing apparatus in which processing means shapes and composes a document including a text, image and graphic form on the basis of the contents of indicating means, and such an apparatus is provided according to another aspect of the invention. When the document is output to a display device or a printing device, these devices are controlled so that the document can conform to the performance of the devices.

BRIEF DESCRIPTION OF THE DRAWINGS

FIG. 8 is a view showing contents to be changed on the basis of an original image and an image on a display device;

DESCRIPTION OF THE PREFERRED EMBODIMENT

The preferred embodiment of the present invention will be described below in detail with reference to the accompanying drawings.

Figure 1:
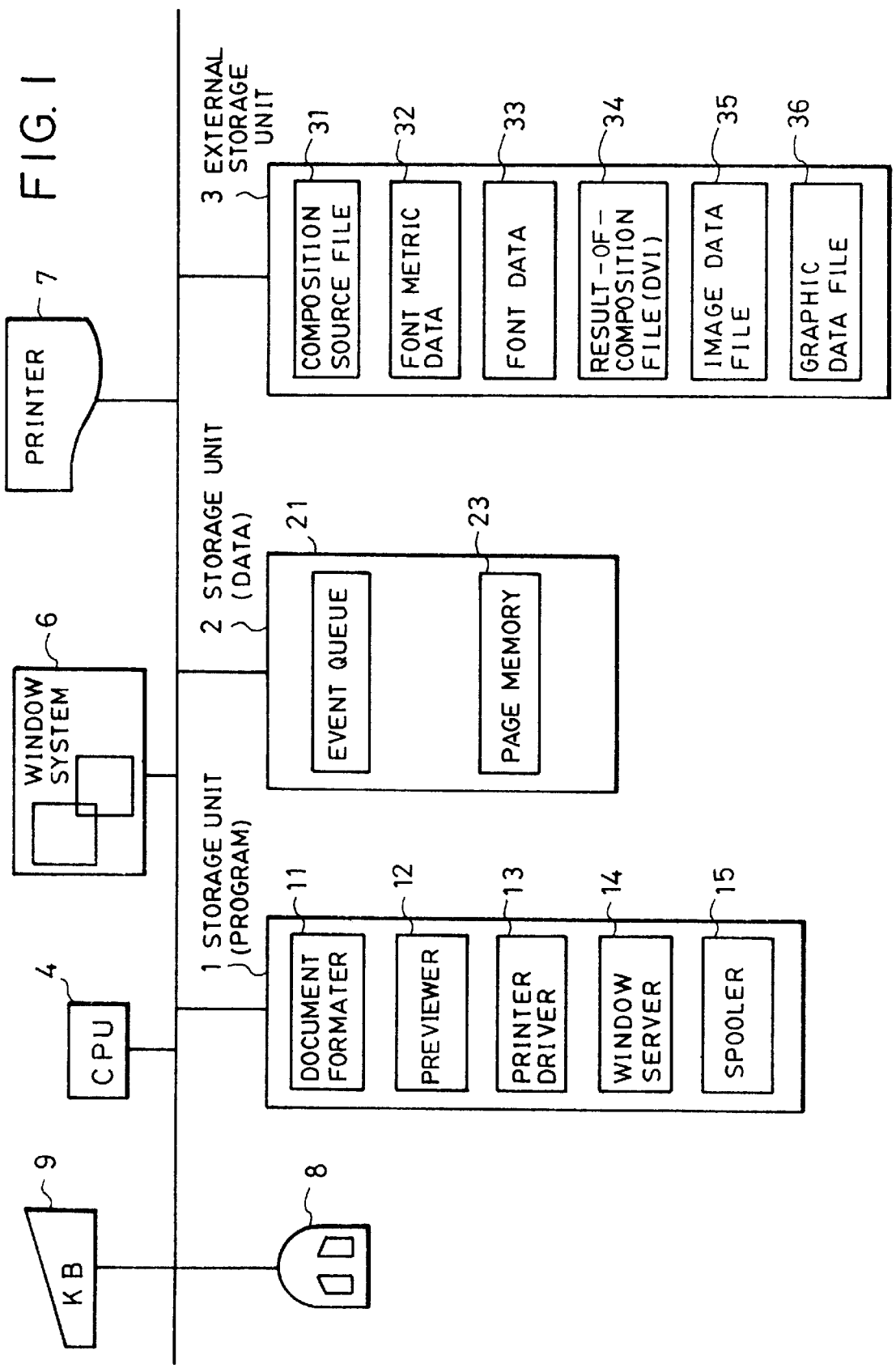
FIG. 1 is a block diagram of a document processing apparatus in accordance with the preferred embodiment.

FIG. 1 is a block diagram showing the configuration of a document processing apparatus according to the preferred embodiment.

Figure 10:
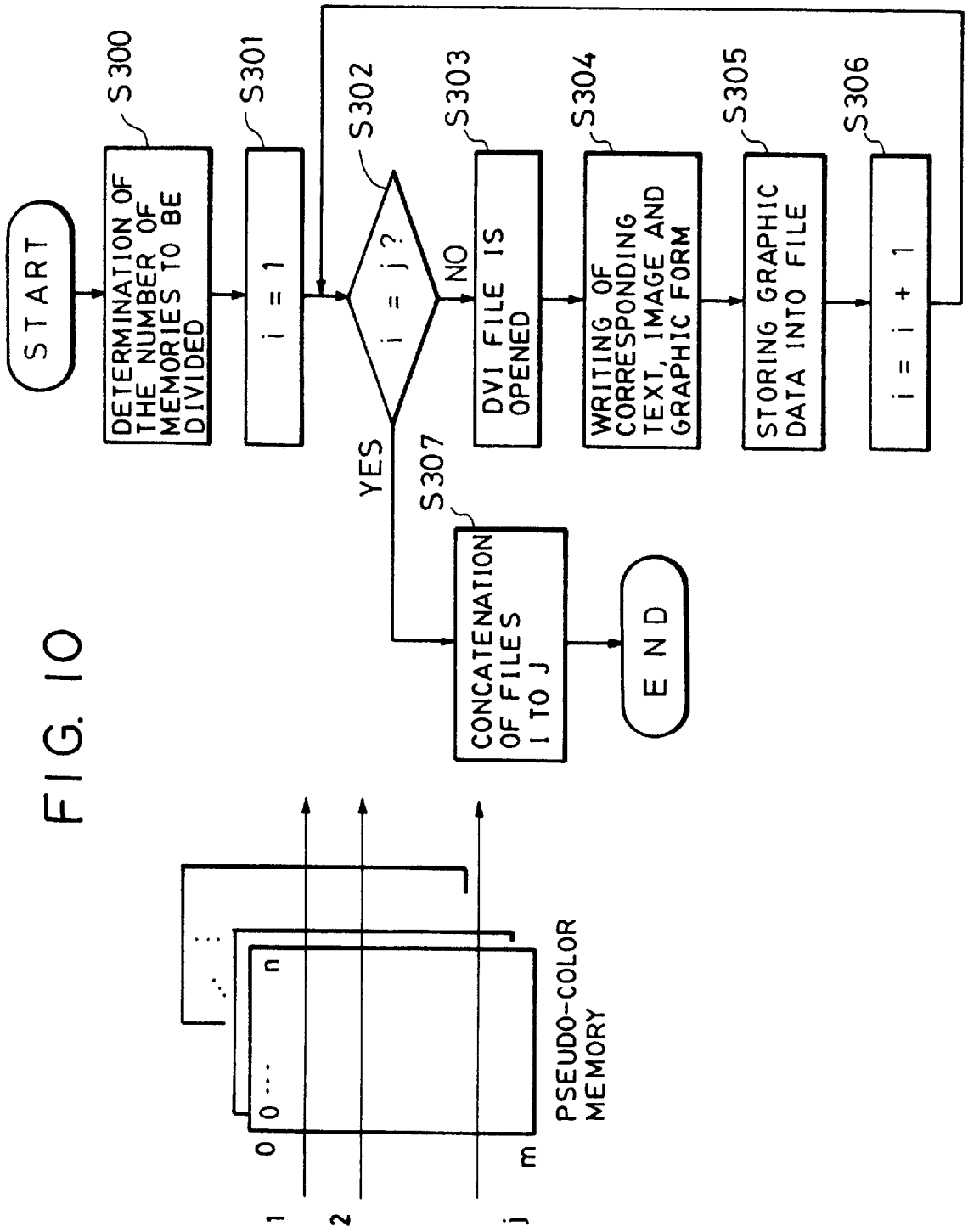
FIG. 10 is a flowchart showing steps of creating a printing file when outputting in a printed form.

In FIG. 1, numeral 1 denotes a storage unit for storing programs for the processes performed by the document processing apparatus (shown in FIGS. 7 and 10); numeral 2, a storage unit for storing data required for the processes of the apparatus; numeral 3, an external storage unit for storing data input to or to be output from the apparatus; and numeral 4, a CPU for performing the processes in accordance with the programs, etc. stored in the storage unit 1. Numeral 6 denotes a multi-window system for displaying the results of the processes performed by the document processing apparatus; numeral 7, a printer for printing the results of the processes; numeral 8, a mouse for inputting commands from the user; and numeral 9, a keyboard with which the user prepares programs and inputs commands to the apparatus.

In the storage unit 1, numeral 11 designates a document formater (composition program) which inputs data from a composition source file 31 and a font metric data file 32, and information on remaining usable space in an image data file 35 and a graphic data file 36, all of which are described later. The document formater 11 then outputs these data to a device independent (DVI) file 34 containing the result of composition. Numeral 12 designates a previewer for displaying the results of the composition on the multi-window system 6. These results are based on the inputs of the DVI file 34, a font data file 33, the image data file 35, and the graphic data file 36, which are all created by the document formater 11. Numeral 13 designates a printing driver (program exclusively used for printing) for outputting the results of the composition onto the printer 7. Numeral 14 designates a window server program for operating the multi-window system 6, and numeral 15, a spooler for printing in accordance with the order in which a printing command is started when it is issued.

In the storage unit 2, numeral 21 indicates an event queue for queuing requests at the window system 6. The user makes these requests using the mouse 8 and the keyboard 9. When the printer (recording device) 7, not equipped with a page descriptive language, such as Post Script, is used to make a record, a host computer must create an image of a given page. Numeral 23 indicates a page memory for image creation and expansion. Images (such as characters and graphic forms) to be recorded are written directly in the page memory 23.

In the external storage unit 3, numeral 31 denotes the composition source file containing composition commands and information on characters, images and graphic forms for composition purposes. Numeral 32 denotes the font metric data file containing information on measurements (the heights, depths and widths) of characters required for character composition, and 33, the font data file containing information on dot patterns or outlines of characters required for printing characters. Numeral 34 denotes the DVI file which is independent of the resolution and other factors of the printer and the display device which store the results of the composition made by the document formater 11. Numeral 35 denotes the image data file containing color image information to be added to documents, and 36, the graphic data file containing color graphic forms (including line graphic forms).

The main flow of a process performed by the thus-constructed document processing apparatus according to this embodiment will be briefly described with reference to FIG. 3.

Figure 2:
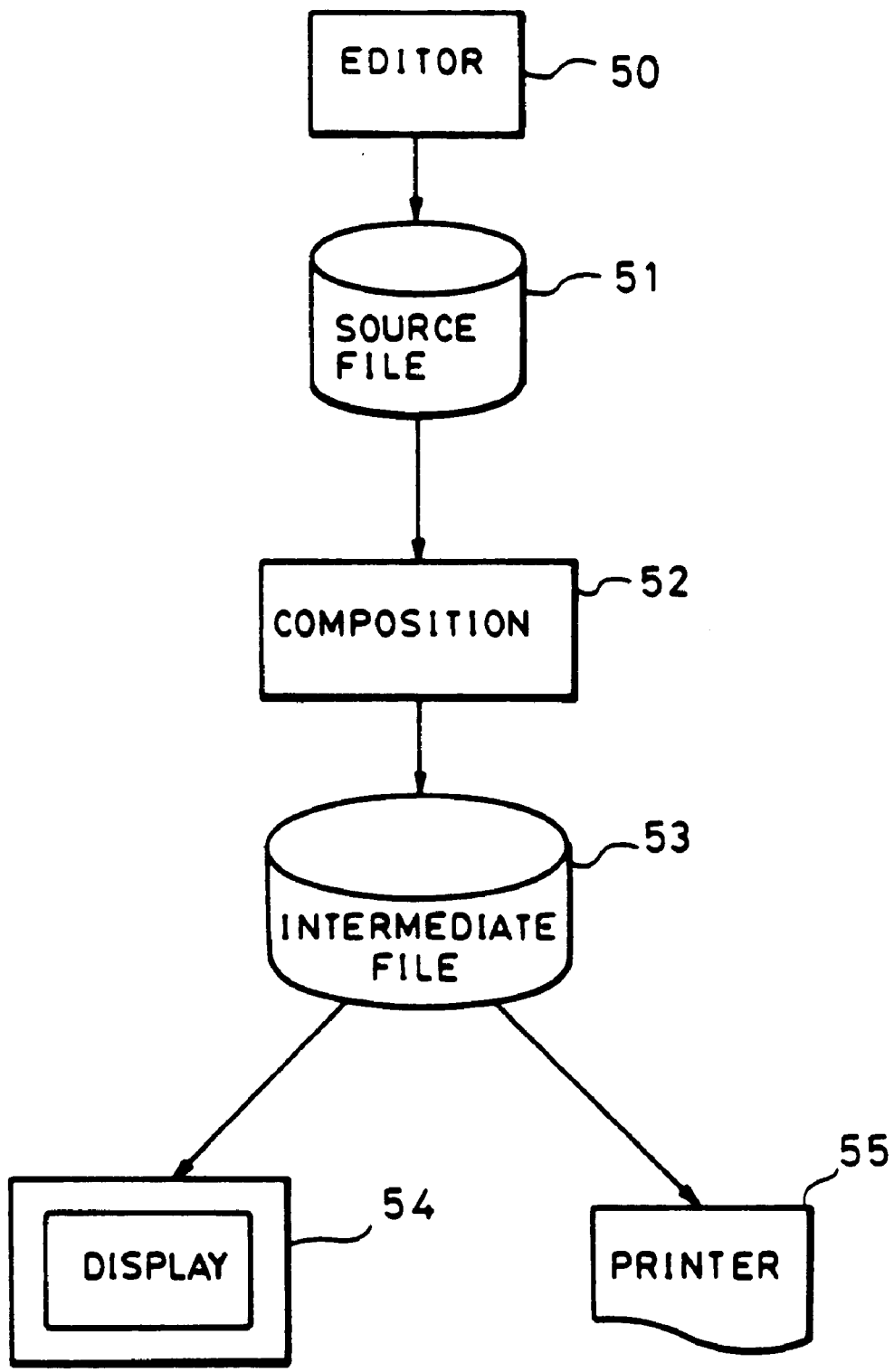
FIG. 2 is a view showing the processing flow of the conventional batch type system.

This main flow is basically similar to that of the conventional batch-type text composition system shown in FIG. 2, except for the following new processes.

(1) It is possible to specify how a color graphic file 92 and a color image file 93 are added to a source file 91 used for a composition process (what sizes of these files 92 and 93 are added to what location of the source file 91). An instruction for coloring texts is added.

(2) As opposed to the conventional composition system in which only texts are arranged, the document processing apparatus of this invention is expanded so as to allow composition which includes information on images and graphic forms with respect to the source file 91 created in item (1).

(3) A process 97 is added in which a text, image and graphic form are combined together and displayed in a full range of colors on the multi-window system 6. This display is made on the basis of an intermediate file 95 while reference is being made to original information stored in the color graphic file 92 and the color image file 93.

(4) In the same manner as in item (3), the text, image and graphic form are also recorded on the printer (recording device) 7.

The above items (1) to (4) will be explained one by one in detail. This embodiment is applicable both to a batch-type document processing apparatus, such as the TEX, the roff or the Scribe, and to a WYSIWYG-type document processing apparatus. For simplicity of explanation, however, a batch-type system will be explained as an example.

(1) As regards coloring texts and means for adding color images and graphic forms Basically, in this document processing apparatus, the color graphic and image files 92 and 93 should be regarded as files different from a text composition file in the system and conform to a standard format utilized in the DTP field.

It is assumed that a Computer Graphics Metafile (CGM, an ISO standard) or Post Script (trademark of Adobe Company) is used as the format of graphic forms, whereas a standard format called a Tag Image File Format (TIFF, trademark of Aldus Company) is used as the format of images. With these formats, item (1) can be employed in various types of document processing apparatuses.

To actually insert an image or a graphic form into a document, the following command is entered to the source file 91 so that a Current Active Position (CAP) can serve as a criterion. An image zone or a graphic form zone is thus allocated when the document is composed.

EXAMPLE (using the CGM):

\cgm{file name=example.cgm,height=5 cm, width=4 cm} where \cgm indicates a command for including the CGM file. The command begins with "\" (back slash) distinguishing it from the text of the document. The contents enclosed by the braces indicate parameters: "file name=" indicates the CGM file to be included actually, and "height=" and "width=" indicate the height and width of the zone in which a graphic form in the CGM file is expanded.

Coloring texts will now be explained. It is possible to employ the method in which a command explicitly specifies information on the colors of fonts as well as the conventional monochromic fonts in order to expand the composition source file 31. In other words, information on colors is added to the conventional information on types and sizes of fonts. This method will be realized by creating a color data base file 98 in which colors are specified as a ratio of the three primary colors (red, green and blue). These colors are explicitly specified in the source file 91.

An example of the construction of the color data base 98 will be described with reference to FIG. 4. In the drawing, colors are indicated on the left-hand side, and components of red, green and blue are indicated in eight bits (0 through 255). Colors indicated by the numeral zero are specified in the form of the least bright colors, whereas those indicated by the numeral 255 are specified in the form of the brightest colors.

Color fonts are specified, as for example, as follows:

\blue (This is a blue text.)
\red (This is a red text.)
\green (this is a green text.)

Figure 3:
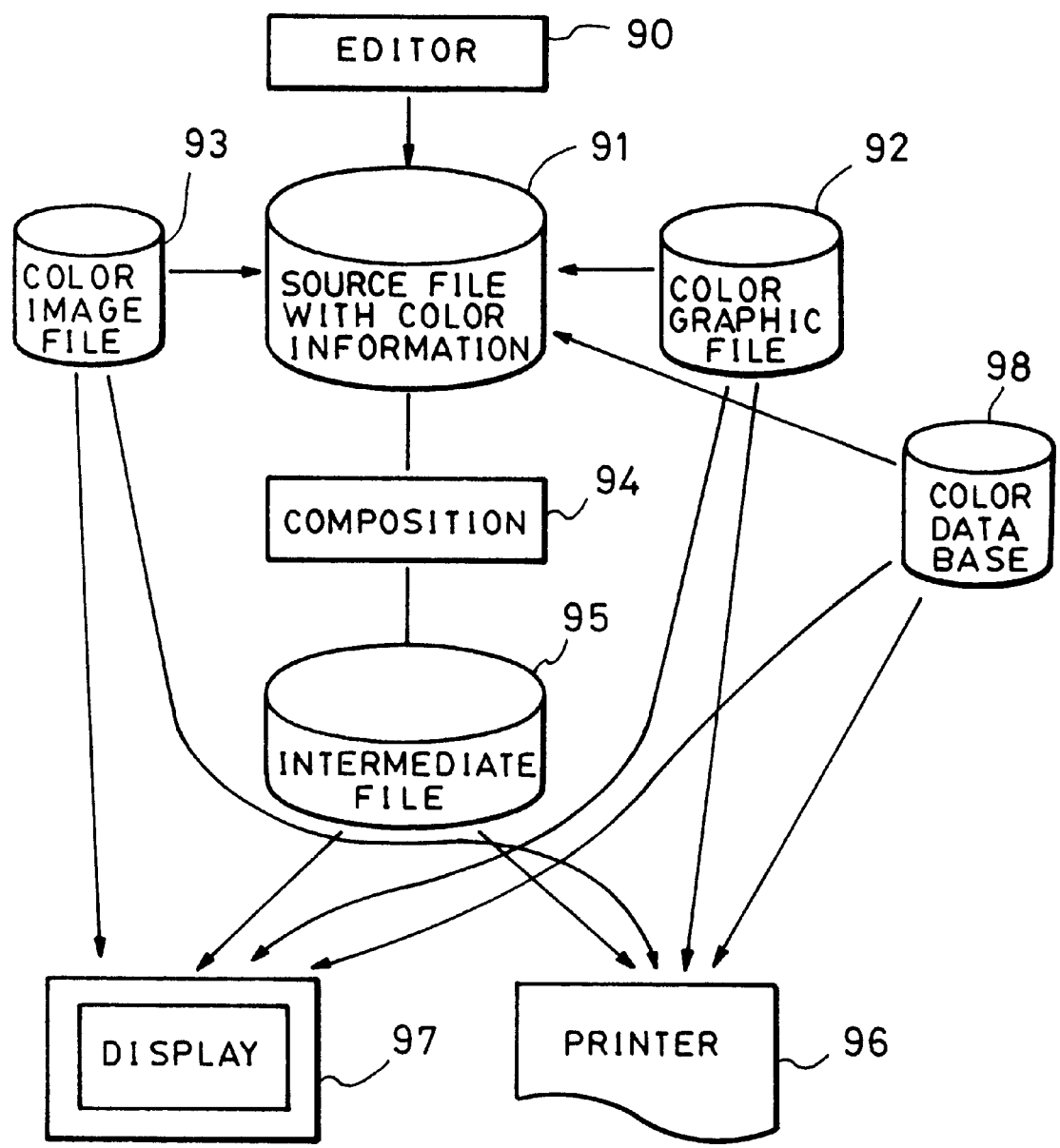
FIG. 3 is a view showing the main flow in the preferred embodiment.

When the color fonts are specified using back slashes and a color name command stored in the color data base 98 shown in FIG. 3, portions are drawn corresponding to colors currently specified.

(2) As regards means for composing color texts, images and graphic forms

For simplicity, a description will be given of the conventional composing system for texts alone, and another description will then be given of a composing system for images and graphic forms.

Basically, composition employs two concepts to actually shape pages. One is the concept of a box: the height, depth and width of every character font change no matter where the character font is located on a given page. The other is the concept of a margin, the amount of the expandable and contractible space between boxes so as to adjust the end of a line, the height of a page, etc.

These two concepts are combined together to determine the position where characters are optimally arranged in a line direction of a page.

Figures 4, 5:
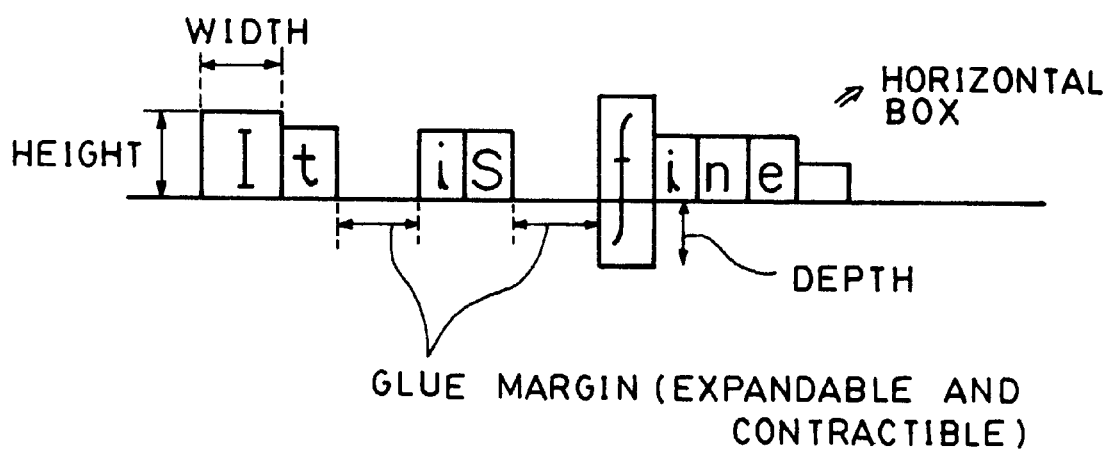
FIG. 4 is a view showing an example of a color data base.
FIG. 5 is a view illustrating the principle of adjusting the space between characters.

Then, the spaces between these characters are adjusted so that a string of the characters is arranged on the page in a well-balanced manner (see FIG. 5).

The composing system for images and graphic forms will be explained. To compose a document including a text, image and graphic form, the image or graphic form is treated as one character font having no width, height or depth, mentioned above. The source file is thereby readily expandable.

The results of the composing such a document are stored in the DVI file 34. The term "device independent" derives from the fact that the results of the composition are retained in a form that is independent of the fonts and the resolution of an output device, and that, as a result, the same results are obtainable whenever they are accessed by any machine.

Figure 6:
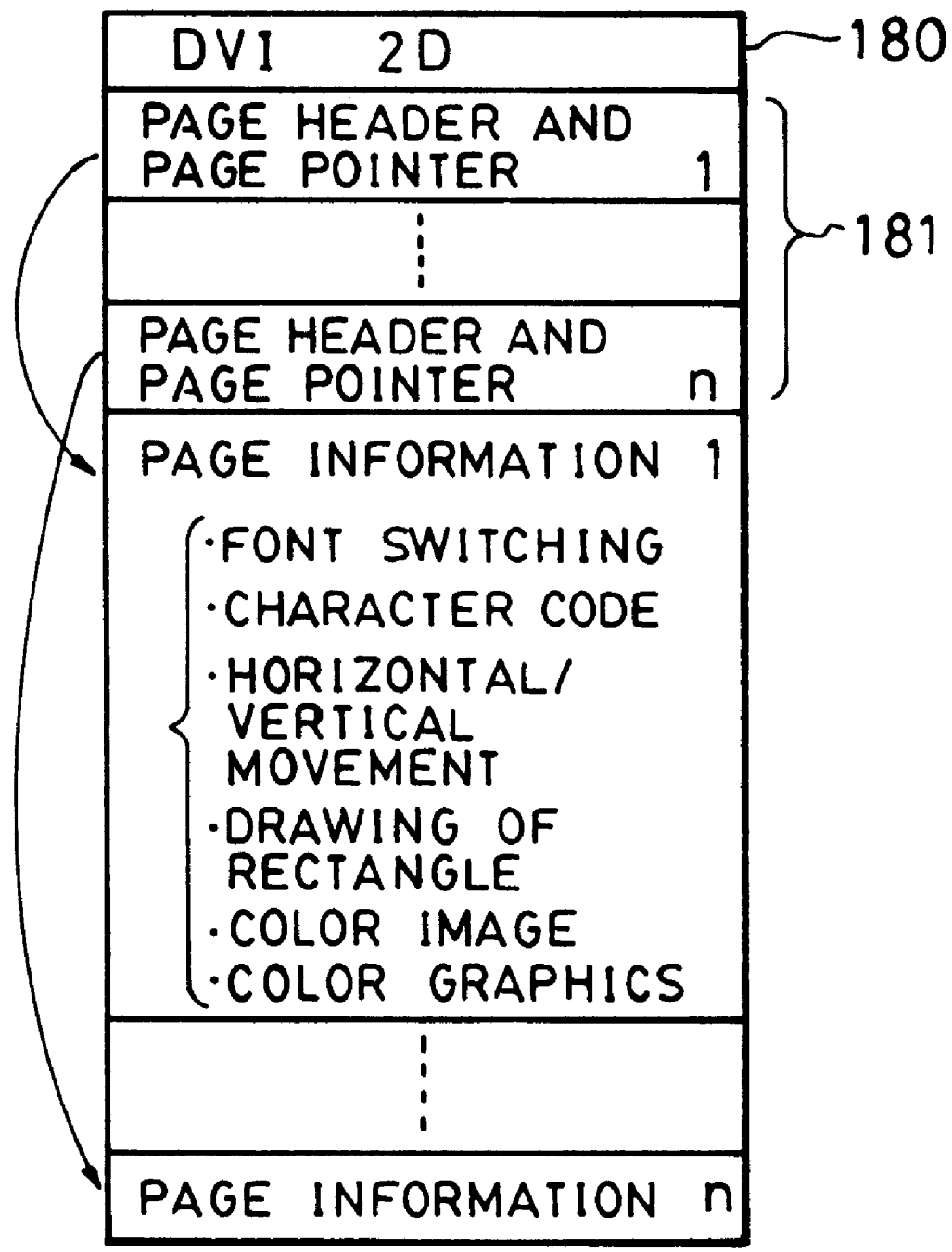
FIG. 6 is a view showing the structure of data in a file containing the results of composition.

FIG. 6 shows an example of the intermediate file 95 containing the results of the composition. In the drawing, numeral 180 designates an identifier showing the DVI file. Numeral 181 designates a page header which contains information and a pointer. The information includes the names, sizes and colors of fonts on a given page, and a pointer indicates composition information 182 containing the results of pages actually composed. The number of page headers 181, each including such a pointer, corresponds to the number of pages. Basically, the composition information 182 includes the following data:

font switching instruction (type face, size and color)

character code the amount of movement from a current position in horizontal and vertical directions drawing a rectangle (width and height specified at the current position)

color image information (the name, width and height of a file)

color graphic form information (the name, width and height of a file)

Since a basic unit, for instance, $2_{-16}$ pt (pt being 1/72 inch), is used to calculate a composition position, there will be no error even when the position is calculated using integers. Calculation with such an accuracy results in the realization of device independence.

(3) As regards previewing (displaying) color texts, images and graphic forms on the window Because multi-fonts have recently become available which are typically used with an X window and a window system having a display function for images and graphic forms, the result of the composition can be confirmed on a screen before being output on the printer (recording device) 7. The results can be previewed rapidly at low cost.

The algorithm for preview will be described below with reference to FIG. 7.

First, in step S201 a determination is made regarding the size of an entire display frame of the window for displaying the result of the composition. Desirably, the size is determined so that the contents can be displayed as much as possible. In step S202 a determination is made whether the window to be displayed has a full range of colors (red, green and blue each being composed of 8 -bit data) or pseudo-colors (3-bit red, 3-bit green and 2-bit blue, or red, green and blue each at 5 levels). If the window does not have a full range of colors, in step S203 a look-up table (LUT) is set up which shows how red, green and blue are colored using 1 -byte information. This limits the number of colors which can be used simultaneously, and completes the initialization of color display.

Since the image actually printed differs in resolution from the image on the screen of a CRT, character fonts for printing must be reduced for display (the number of dots must be reduced). Similarly, a color image and graphic form for printing must also be reduced for display. Such a reduction factor is determined in step S204. This determination is made by comparing the size of the dots on the screen in vertical and horizontal directions with the size of the dots on an original document in vertical and horizontal directions. This document is assumed to have the resolution of fonts to be used.

After the above preparations have been completed, the DVI file, created by the document formater 11 for display purposes, is opened to seek information, corresponding to the DVI file, by scrolling the page headers 181 shown in FIG. 6 (step S205). Then the composition information 182 is scanned command by command (step S206). Processing routines (steps S209–S219) are executed until a given page is processed completely (step S207).

These processing routines are roughly divided into the following five commands:

a. Character command (steps S209 and S210)

The character command has character codes in the form of parameters, and displays them at a Current Active Position (CAP). The character codes are specified by the current types, sizes and colors of fonts. Fonts specified by a font switching instruction are utilized. When the fonts are switched, a pointer is available which is used in the step where the font metric file 32 is accessed on a 1-byte (Roman letters) or 2-byte (Japanese characters) basis. If the window system has a full range of colors, then red, green and blue, that is, three pieces of information each composed of 8 bits, are specified as the colors of the fonts. The three colors are specified in the color data base 98. Otherwise, red, green and blue, each being composed of 8 bits, are converted to the same colors totaling 24 bits. The results of this conversion specify the color attribute of the fonts. Thus, in this step, color characters are displayed on the window by providing a function, indicated by the pointer, with the character codes and information on the CAP. However, such a method of displaying characters varies with differences in the shapes of window systems and methods of accessing the font metric file 32.

For instance, even in a server/client model such as an X window, methods of using the window depend on whether the fonts for display are on a client side or on a server side.

A significant difference is whether font patterns are accessed on the client side or on the server side. When the font patterns are accessed on the client side, the fonts are reduced according to the reduction factor determined in step S204 so that the fonts are converted to forms most suitable for display on the window before a font image is sent to the server.

On the contrary, when the fonts are on the server side, they cannot be enlarged or reduced. Therefore, of the fonts within the server, the closest fonts are selected, and the character codes alone are sent from the client side.

b. Image command (steps S211 and S212)

To paste an image in a document, first, an original image is converted into the size of the image to be displayed (width and height as described above). Then, this size is also converted by a reduction/enlargement factor (hereinafter referred to as a magnification) to display the image on the window. These two conversions are combined together and expressed by one conversion.

orig-width: the number of valid dots of the original image in a width direction (original resolution)

orig-height: the number of valid dots of the original image in a height direction (original resolution)

dest-width: the number of dots of the composition in a width direction (with the resolution assumed in step S204)

dest-height: the number of dots of the composition in a height direction (with the resolution assumed in step S204)

A conversion ratio is determined by the following equation:

$$\text{conversion ratio} = \min\left(\frac{\text{dest-width}}{\text{orig-width}}, \frac{\text{dest-height}}{\text{orig-height}}\right) \times \text{magnification in step S204}$$

This shows that if the size of a 400 d.p.i. original image is 100×100 dots, if this image is intended to be printed in a zone having a width of 1 cm and a height of 2 cm, and if the resulting image is intended to be displayed on a 100 d.p.i. window, then the conversion ratio can be obtained as follows:

$$\min\left(\frac{2/2.54}{1/4}, \frac{1/2.54}{1/4}\right) \times \frac{1}{4} = \frac{1}{2.54}$$

In this embodiment, the image is assumed to be enlarged or reduced at the same ratio in x and y directions. The original image is thus enlarged or reduced in accordance with such a conversion ratio. When the original image is reduced, it is directly reduced in the x and y directions, whereas when the original image is enlarged, it is enlarged in such a manner as to be adjusted in the x and y directions. Other than the above method, it may also be possible to select various methods, such as the one in which an image is enlarged or reduced while neighboring images are ORed. In the next process, after the size of the image has been converted into the display size, the depth of color must be converted so as to decrease the difference in accuracy between the colors of the original image and those of the image displayed.

Conversion patterns as shown in FIG. 8 may be employed when three typical kinds of colors are considered: a monochrome (1 bit), pseudo-colors (8 bits) and a full range of colors (24 bits).

When a display image corresponding to the accuracy of colors of the window is obtained, information on this image and the CAP is sent to the window server 14 so that the image can be displayed on the window.

c. Graphic form command (steps S213 and S214)

In the same manner as that described with images, the magnification for reducing or enlarging the original graphic form to a graphic form suitable for composition is multiplied by the magnification determined in step S204. First, an equation for converting graphic form coordinates to coordinates on the window is determined.

Then, when the graphic form file 92 is scanned to locate a graphic element, the above equation is applied to the graphic form coordinates so that the graphic form coordinates are convert to coordinates on the window. A graphic form drawing routine corresponding to the window is then called.

Whenever the color element of the graphic form is changed, a color specifying command is sent to update the current color attribute, as described in the case of a text.

d. Command for moving position (steps S215 and S216)

Amounts corresponding to the amounts of movement in horizontal and vertical directions are added to variables h and w which internally retain CAP coordinates in order to maintain a current position (x and y).

e. Font switching command (steps S217 and S218)

In the case of, for example, the X window having the font patterns on the client side, when the font switching instruction (information on type face, size, color, etc.) is entered, a pointer is switched over to a function by which the fonts within the client are accessed. On the contrary, when the font patterns are on the server side, an instruction for switching the fonts to the optimum forms is sent from the client to the server. The fonts are switched within the server.

(4) Printing color texts, images and graphic forms

A mechanism will be described in which a printing function controls a color printing device required for color DTP, such as a color LBP or a color ink jet device. This control is based on the results of the composition on the host side. Two types of recording methods will be explained. There is one method by which, when the printer side is equipped with a page memory and a command interpreter, images are printed in accordance with commands from the host side, as in the case of a color Post Script printer. There is another method by which, when the host side is equipped with a page memory whose capacity is equal to a depth direction corresponding to accuracy of colors on the printer, video information is sent to a recording device via a communication line or a bus so as to print images. As there is a much greater load on the host side when the latter method is used than when the former method is used, the latter has more technical problems.

These two method will be described below in detail.

(4-a) The first recording method

The basic processing flow for this method is similar to the flow shown in FIG. 7 described with reference to item (3). Points to consider will be described when the results of the composition are converted into a page descriptive language of the recording device.

a) Scaling for converting images to predetermined sizes

If the page descriptive language has a function to support scaling, this function is utilized. If not, the original image is converted on the host side in accordance with the magnification, as described in item (3). Scaling is added to positional information of graphic forms, and a command is sent to the recording device.

b) Color conversion corresponding to accuracy of colors of the recording device

A color command for the original text, image, and graphic form is converted in accordance with the accuracy of colors of the recording device. Information is sent to the recording device, whereby recording is performed.

(4 -b) The second recording method

After document information has been expanded, all information on the page memory is sent to the recording device in the form of video information. In this method, the page memory 23 installed in the host (main device) is utilized on the assumption that the recording device side does not have a mechanism to analyze a page descriptive language, such as the Post Script, for recording. After information on texts, images and graphic forms has been expanded in the page memory 23, it is transferred to the recording device in the form of a video signal for printing.

While the depth is considered, memories are dynamically allocated to the page memory 23 in accordance with the accuracy of the colors of an output device, that is, with a monochrome (1 bit), pseudo-colors (8 bits) and a full range of colors (24 bits). Original information on the degree of the depths of colors is converted so as to agree with the accuracy of colors on the side of the recording device. This is a crucial point in processing.

The arrangement of the page memory 23 will be described with reference to FIG. 9.

As regards a monochromic bit map

As shown in FIG. 9 (A), the map is scanned in a line direction. An 8-bit form is packed into a 1-byte form to store information. When one line is composed of n dots, padding in an amount equal to 8- (n mod 8) bits is performed so that dots are readily accessed and the end of the line agrees with a byte zone. Then information on the next line is assigned continuously by the next byte. "mod" as in "A mod B" is a function whose value equals the remainder obtained when A is divided by B.

As regards a pseudo-color bit map

As shown in FIG. 9 (B), eight sheets of bit maps mentioned above are superposed on each other. Every pixel is represented in 1 byte (8 bits). To represent color information in 1 byte in a standard manner, 3 bits are assigned to red and green each, and 2 bits to blue.

Some recording devices do not have such colors, but instead, have tones ranging from white to black, thus reproducing shades. In this case, it is possible to represent shades having a total of 256 tones in 8 bits.

As regards a bit map having a full range of colors

As shown in FIG. 9 (C), an independent page memory is assigned to red, green and blue each in a line direction. One byte is exclusively used for one pixel for each red, green and blue. It is possible to employ either of the following two methods for transmission to the recording device.

A) Red, green and blue are sent plane by plane

B) Red, green and blue are sent in this order pixel by pixel

Because the method which is used depends on the type of recording device, before operation, the type of recording device should be confirmed.

It should be noted that in the case of the monochromic bit map, an image already drawn can be ORed. However, in the cases of the pseudo-colors and a full range of colors, it is impossible to produce a color assumed to be ORed. Therefore, a process is employed in which information on texts, images and graphic forms with specified colors is set to the page memory 23. In this process, basically, priority goes to information written at a later time, and thus the capacity of representing color information becomes a problem.

To enhance the capacity of representation, a technique introducing an overlay or alpha plane can be employed.

Overlay Plane

Standard color text, image and graphic form are expanded onto a plane having pseudo-colors or a full range of colors in the page memory. At the same time, for example, a monochromatic text, image, and graphic form are expanded onto an overlay plane having a depth of 1 bit. Monochromatic information prior to color information of the overlay plane is printed (see FIG. 9 (D)).

Another problem lies in the fact that when a resolution of 400 d.p.i. is used and when information is output on A4-size paper, a page memory is required which has a capacity of 2 Mbytes for monochrome, 16 Mbytes for pseudo-colors, and 48 Mbytes for a full range of colors.

Except for monochrome, there will be no problem if a standard workstation (WS) can hold a page memory whose capacity is large enough to store pseudo-colors and a full range of colors. In most cases, however, it is difficult for the WS to hold a page memory having such a large capacity at one time. To solve this problem, the page memory is divided into several memories and an image is also divided into several images. The divided images are then linked together to create the final image. This will be explained with reference to FIG. 10. First, the number of pseudo-color memories to be divided is determined on the basis of the capacity of the apparatus to which the divided pseudo-color memories are assigned at one time. If this capacity is, for example, about 5 Mbytes, the following equation is established:

$$16\ M/4 = 4\ \text{Mbytes}$$

The pseudo-color memory can thus be divided into four memories in a column direction (step S300). If the total number of columns when the DVI file is scanned the first time is expressed by m, pseudo-color memories equal to an amount 0–m/4 lines are obtained. Information on a text, image and graphic form is written to the pseudo-color memories (step S304). After the DVI file has been read, the information contained in the pseudo color memories is written to files corresponding to the divided memories (step S305).

Thereafter, the information is written to the page memory divided into the same number of memories as the number of divided pseudo-color memories. Then the files are concatenated together to create one complete pseudo-color page memory (step S307).

Though this embodiment has been described where it is applied to pseudo-colors, it may be equally applied to a full range of colors.

Figure 7:
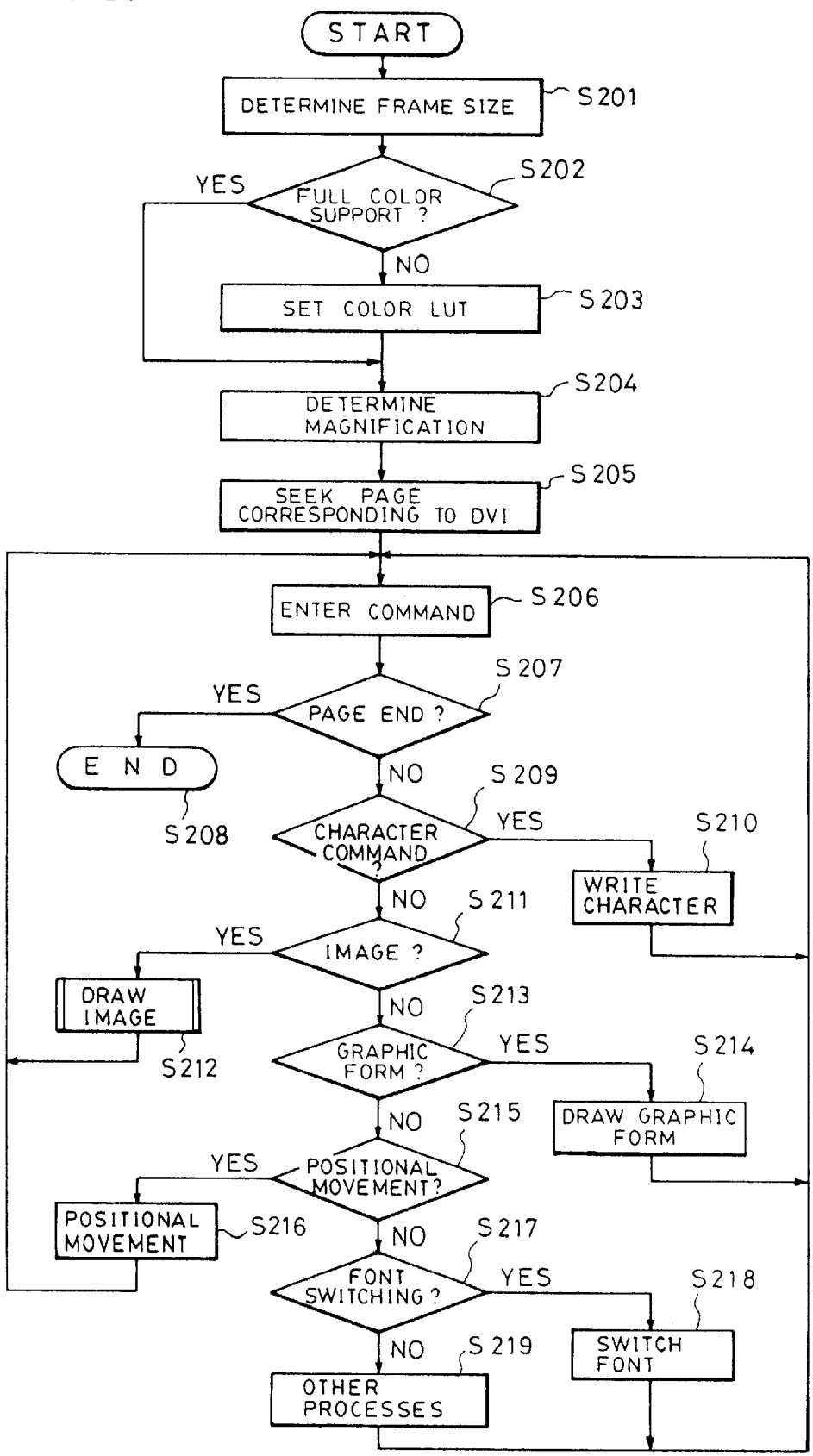
FIG. 7 is a flowchart for displaying documents.
Figure 9A:
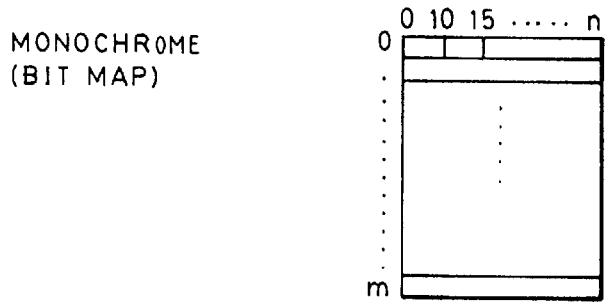
FIGS. 9(A) to 9(D) are views showing how a display memory is used based on the contents illustrated in FIG. 8.
Figure 9B:
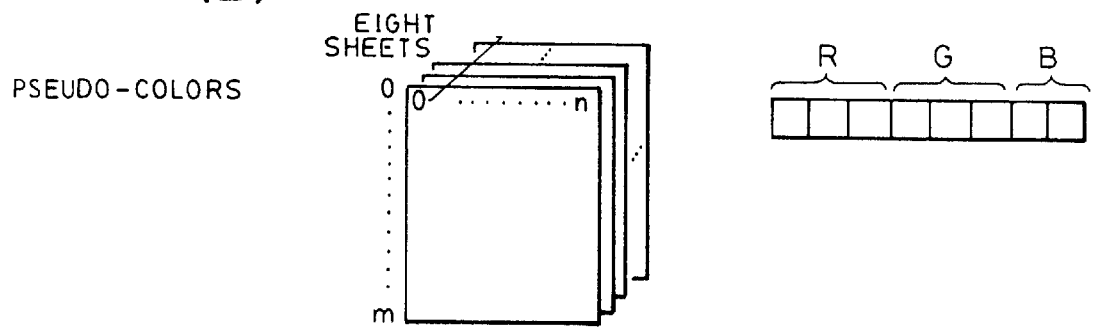
Figure 9C:
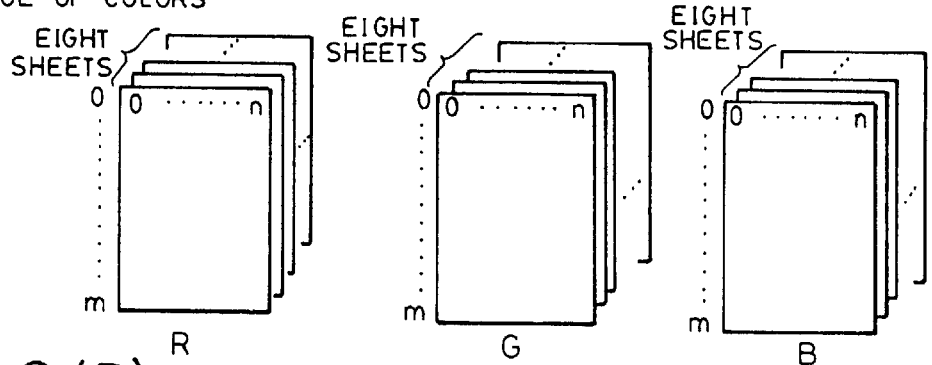
Figure 9D:
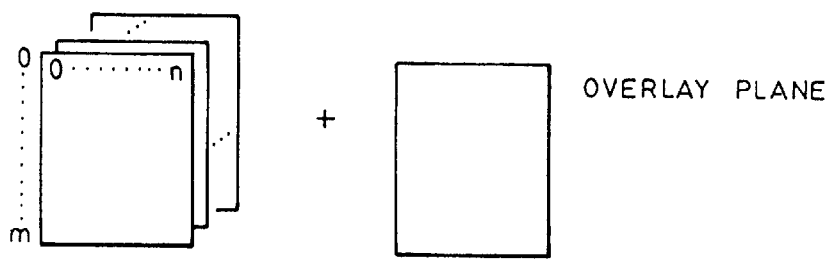

Last, the algorithm for writing a text, image and graphic form to the page memory for printing purposes is the same as that for preview purposes shown in FIG. 7, except that the determination of the magnification in step S204 is required for reducing an image for display, but not required for printing.

As has been described above, although it is difficult for the conventional batch-type system to provide an environment where texts, images and graphic forms are colored and treated together, this embodiment makes it possible to provide such an environment.

As explained in connection with the preferred embodiment, the document processing apparatus of the present invention is constructed while the concept of "device independence" is taken into consideration so as to cope with various types of recording devices and window systems. Therefore, the document processing apparatus of this invention is advantageous to other various types of document processing apparatuses and data exchange with them.

Although this embodiment has been described with a batch-type document processing apparatus, it is applicable to a WYSIWYG-type document processing apparatus because the latter type, like the former type, is composed of modules of display, printing, information required for composition, and the results of composition, except for a user interface portion.

As has been described above, the present invention enables the user not only to edit color texts and images, but also to output the results of the editing so that the text and images can conform to the function of a display device or a printing device connected to the document processing apparatus.

What is claimed is:

1. An output control apparatus in which a plurality of images having a plurality of accuracy of colors are output to output devices which have different accuracy of colors, respectively, comprising:

a setting means for setting an accuracy of colors of a storage means to correspond to an accuracy of colors of an output device;

a processing means for processing a change of colors of each of the plurality of images having the plurality of accuracy of colors, for each to correspond to the accuracy of colors of the output device as set by said setting means, and for storing in said storage means the plurality of images with change of colors; and an output means for outputting to the output device the plurality of images with change of colors which are stored in said storage means.

2. An output control apparatus according to claim 1, further comprising:

an output device for visibly outputting the the plurality of images with change of colors output by said output means.

3. An output control apparatus according to claim 2, wherein said output device is a printer or display device.

4. An output control apparatus according to claim 1, wherein the accuracy of colors is 1 bit indicating black and white, 8 bits indicating a quasi-color and 24 bits indicating a full-color.

5. An output control apparatus according to claim 1, wherein the image data is written based on document information including text, figure and image data.

6. An output control apparatus according to claim 1, wherein the document data consists of text data which consists of a character code, font, size, and color information.

7. An output control apparatus according to claim 1, wherein the document data consists of graphic data which consists of graphic data of an original coordinate system and color information.

8. An output control method in which a plurality of images having a plurality of accuracy of colors are output to output devices which have different accuracy of colors, respectively, comprising:

a setting step of setting an accuracy of colors of a storage device to correspond to an accuracy of colors of an output device;

a processing step of processing a change of colors of each of the plurality of images having the plurality of accuracy of colors, for each to correspond to the accuracy of colors of the output device as set by said setting step, and for storing in the storage device the plurality of images with change of colors; and an output step of outputting to the output device the plurality of images with change of colors which are stored in the storage means.

9. A method according to claim 8, including the step of:

visibly outputting the plurality of images with change of colors.

10. A method according to claim 9, wherein said output device is a printer or display device.

11. An output control method according to claim 8, wherein the accuracy of colors is 1 bit indicating black and white, 8 bits indicating a quasi-color and 24 bits indicating a full-color.

12. An output control method according to claim 8, wherein said output device is a printer or display device.

13. An output control apparatus according to claim 8, wherein the image data is written based on document information including text, figure and image data.

14. An output control apparatus according to claim 8, wherein the document data consists of text data which consists of a character code, font, size, and color information.

15. An output control apparatus according to claim 8, wherein the document data consists of graphic data which consists of graphic data of an original coordinate system and color information.

16. An output control apparatus comprising:

writing means for writing bit-map data for a segment, wherein one page is divided into a plurality of segments in a direction of sub-scanning; and determining means for determining a size of said segment to be written as bit-map data by said writing means in accordance with an accuracy of colors.

17. An output control apparatus according to claim 16, further comprising:

output means which outputs bit-mapped data written by said writing means.

18. An output control apparatus according to claim 17, wherein said output means outputs bit-map data to a file.

19. An output control apparatus according to claim 16, wherein said bit-map data is written based on character data, image data and/or figure data.

20. An output control apparatus according to claim 19, wherein the text data consists of a character code, font, size, and color information.

21. An output control apparatus according to claim 19, wherein the graphic data consists of graphic data of an original coordinate system and color information.

22. An output control apparatus according to claim 16, wherein the accuracy of colors is 1 bit indicating black and white, 8 bits indicating a quasi-color and 24 bits indicating a full-color.

23. An output control apparatus according to claim 1 or 16, further comprising:

input means for inputting an instruction of an operator.

24. An output control apparatus according to claim 23, wherein said input means is a keyboard.

25. An output control method comprising the steps of:

writing bit-map data for a segment, wherein one page is divided into a plurality of segments in a direction of sub-scanning;

determining a size of said segment to be written as bit-map data by said writing step in accordance with an accuracy of colors.

26. The output control method according to claim 25, including the step of:

outputting bit-map data written by said writing step.

27. The output control method according to claim 26, wherein said output step outputs bit-map data to a file.

28. An output control method according to claim 25, wherein said bit-map data is written based on character data, image data and/or figure data.

29. An output control method according to claim 28, wherein the text data consists of a character code, font, size, and color information.

30. An output control method according to claim 28, wherein the graphic data consists of graphic data of an original coordinate system and color information.

31. An output control apparatus according to claim 25, wherein the accuracy of colors is 1 bit indicating black and white, 8 bits indicating a quasi-color and 24 bits indicating a full-color.

32. An output control method according to claim 8 or 25, further comprising the step of:

inputting an instruction of an operator.

33. An output control method according to claim 32, wherein in said inputting step the operator uses a keyboard for inputting the instruction.

34. An output control apparatus comprising:

writing means for writing bit-map data for a segment, wherein one page is divided into a plurality of segments in a direction of sub-scanning; and determining means for determining a size of a segment to be written as bit-map data by said writing means in accordance with a number of bits representing one pixel of the bit-map data.

35. An output control apparatus according to claim 34, further comprising:

output means which outputs bit-mapped data written by said writing means.

36. An output control apparatus according to claim 35, wherein said output means outputs bit-map data to a file.

37. An output control means according to claim 35, wherein said output means is a printer or a display.

38. An output control apparatus according to claim 34, wherein the bit-map data is written based on character data, image data and/or figure data.

39. An output control apparatus according to claim 38, wherein the character data consists of a character code, font, size, and color information.

40. An output control apparatus according to claim 38, wherein the image data consists of graphic data of an original coordinate system and color information.

41. An output control apparatus according to claim 34, further comprising:

input means for inputting an instruction of an operator.

42. An output control apparatus according to claim 41, wherein said input means is a keyboard.

43. An output control apparatus according to claim 34, wherein the number of bits is one of 1 bit, 8 bits, and 24 bits.

44. An output control method comprising:

a writing step of writing bit-map data for a segment, wherein one page is divided into a plurality of segments in a direction of sub-scanning; and a determining step of determining a size of a segment to be written as bit-map data by said writing step in accordance with a number of bits representing one pixel of the bit-map data.

45. An output control method according to claim 44, further comprising:

an output step of outputting bit-mapped data written by said writing means.

46. An output control method according to claim 45, wherein said output steps is performed by a printer or a display.

47. An output control method according to claim 45, wherein said output step outputs bit-map data to a file.

48. An output control method according to claim 44, wherein the bit-map data is written based on character data, image data and/or figure data.

49. An output control method according to claim 48, wherein the character data consists of a character code, font, size, and color information.

50. An output control method according to claim 48, wherein the image data consists of graphic data of an original coordinate system and color information.

51. An output control method according to claim 44, further comprising:

an input step of inputting an instruction of an operator.

52. An output control method according to claim 51, wherein said input is performed using a keyboard.

53. An output control method according to claim 44, wherein the number of bits is one of 1 bit, 8 bits, and 24 bits.

54. A computer readable medium having recorded thereon codes for implementing a computer implementable method of controlling an output control apparatus, comprising:

a writing step of writing bit-map data for a segment, wherein one page is divided into a plurality of segments in a direction of sub-scanning; and a determining step of determining a size of a segment to be written as bit-map data by said writing step in accordance with a number of bits representing one pixel of the bit-map data.

55. A medium according to claim 54, further comprising:

an output step of outputting bit-mapped data written by said writing means.

56. A medium according to claim 55, wherein said output step outputs bit-map data to a file.

57. A medium according to claim 55, wherein said output step is performed by a printer or a display.

58. A medium according to claim 54, wherein the bit-map data is written based on character data, image data and/or figure data.

59. A medium according to claim 58, wherein the character data consists of a character code, font, size, and color information.

60. A medium according to claim 58, wherein the image data consists of graphic data of an original coordinate system and color information.

61. A medium according to claim 54, further comprising;

an input step of inputting an instruction of an operator.

62. A medium according to claim 61, wherein said input step is performed using a keyboard.

63. A medium according to claim 54, wherein the number of bits is one of 1 bit, 8 bits, and 24 bits.

64. A computer readable medium having recorded thereon codes for implementing a computer implementable output control method in which a plurality of images having a plurality of accuracy of colors are output to output devices which have different accuracy of colors, respectively, comprising:

a setting step of setting an accuracy of colors of a storage device to correspond to an accuracy of colors of an output device;

a processing step of processing a change of colors of each of the plurality of images having the plurality of accuracy of colors, for each to correspond to the accuracy of colors of the output device as set by said setting step, and for storing in the storage device the plurality of images with change of colors; and an output step of outputting to the output device the plurality of images with change of colors which are stored int eh storage means.

65. A computer readable medium having recorded thereon codes for implementing a computer implementable method of controlling an output control apparatus comprising:

a writing step of writing bit-map data for a segment, wherein one page is divided into a plurality of segments in a direction of sub-scanning; and a determining step of determining a size of the segment to be written as bit-map data by said writing step in accordance with an accuracy of colors.

* * * * *

UNITED STATES PATENT AND TRADEMARK OFFICE
CERTIFICATE OF CORRECTION

PATENT NO. : 5,943,680

DATED : August 24, 1999

INVENTOR(S) : HARUO SHIMIZU ET AL.

It is certified that error appears in the above-identified patent and that said Letters Patent is hereby corrected as shown below:

COLUMN 6:

Line 32, "$2_{-16}$ pt" should read --$2^{-16}$ pt--; and
Line 54, "8 -bit" should read --8-bit--.

COLUMN 8:

Line 53, "convert" should read --converted--.

COLUMN 9:

Line 23, "method" should read --methods--.

COLUMN 12:

Line 8, "the the" should read --the--.

COLUMN 14:

Line 10, "means" should read --apparatus--; and
Line 41, "steps" should read --step--.

UNITED STATES PATENT AND TRADEMARK OFFICE
CERTIFICATE OF CORRECTION

PATENT NO.   : 5,943,680
DATED        : August 24, 1999
INVENTOR(S)  : HARUO SHIMIZU ET AL.

It is certified that error appears in the above-identified patent and that said Letters Patent is hereby corrected as shown below:

COLUMN 16:

Line 17, "int eh" should read --in the--.

Signed and Sealed this

Twenty-ninth Day of August, 2000

Attest:

Attesting Officer

Q. TODD DICKINSON
Director of Patents and Trademarks